(12) United States Patent  (10) Patent No.: US 7,289,119 B2
Heirich et al.  (45) Date of Patent: Oct. 30, 2007

(54) STATISTICAL RENDERING ACCELERATION

(75) Inventors: Alan Bryant Heirich, Foster City, CA (US); Axel Mamode, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 235 days.

(21) Appl. No.: 11/126,496

(22) Filed: May 10, 2005

(65) Prior Publication Data

US 2006/0256112 A1  Nov. 16, 2006

(51) Int. Cl.
*G06T 15/00* (2006.01)
*G06T 15/10* (2006.01)
*G06T 15/20* (2006.01)

(52) U.S. Cl. .................... 345/427; 345/619
(58) Field of Classification Search ........... 345/427, 345/619
See application file for complete search history.

(56) References Cited

U.S. PATENT DOCUMENTS

| | | | | |
|---|---|---|---|---|
| 5,412,764 | A * | 5/1995 | Tanaka | 345/424 |
| 5,442,733 | A * | 8/1995 | Kaufman et al. | 345/424 |
| 5,594,844 | A * | 1/1997 | Sakai et al. | 345/427 |
| 6,111,582 | A * | 8/2000 | Jenkins | 345/421 |
| 6,538,651 | B1 * | 3/2003 | Hayman et al. | 345/419 |
| 6,614,432 | B1 * | 9/2003 | Merrill | 345/428 |
| 7,079,151 | B1 * | 7/2006 | Rublee | 345/589 |
| 2002/0175913 | A1 * | 11/2002 | Rockwood | 345/423 |
| 2003/0193498 | A1 * | 10/2003 | Srinivasa et al. | 345/419 |
| 2004/0125103 | A1 * | 7/2004 | Kaufman et al. | 345/419 |
| 2005/0017971 | A1 * | 1/2005 | Ard | 345/423 |
| 2006/0204121 | A1 * | 9/2006 | Bryll | 382/255 |

OTHER PUBLICATIONS

Kalaiah, Aravind; Varshney, Amitabh; "Statistical Geometry Representation for Efficient Transmission and Rendering;" Apr. 2005; ACM Transactions On Graphics; vol. 24; Issue 2; p. 1-30.*
Correa, Wagner T., et al., "Visibility-Based Prefetching for Interactive Out-Of-Core Rendering," *Department of Computer Science, Princeton University*, 35 Olden St., Princeton, NJ 08540, (2003).

* cited by examiner

*Primary Examiner*—Mark Zimmerman
*Assistant Examiner*—Crystal Murdoch
(74) *Attorney, Agent, or Firm*—Townsend and Townsend and Crew LLP (57) ABSTRACT

Different rendering techniques are selected for portions of a scene based on statistical estimates of the portions' rendering costs. A scene is partitioned into a bounding volume hierarchy. Each bounding volume includes a statistical model of the spatial distribution of geometric primitives within the bounding volume. An image to be rendered is partitioned into screen regions and each screen region is associated with one or more bounding volumes and their statistical models. The associated statistical models of a screen region are evaluated to estimate the rendering cost, such as the probable number of geometric primitives per pixel, for the screen region. Based on the rendering cost, the screen region is assigned to a dense geometry renderer, such as a ray tracing renderer, or a sparse geometry renderer, such as a rasterization renderer. Rendered screen regions are combined to form a rendered image.

38 Claims, 6 Drawing Sheets

STATISTICAL RENDERING ACCELERATION

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. There are many different types of rendering techniques, each with their advantages and disadvantages. Among these rendering techniques are ray tracing and rasterization.

Rasterization typically transforms the geometry of a three-dimensional scene into a coordinate system associated with a specific viewpoint and applies scan conversion to the transformed geometry to create sets of pixels forming all or part of a rendered image. Rasterization techniques typically apply clipping algorithms to determine a subset of the geometry of a scene that are potentially visible from the viewpoint. Then, rasterization techniques scan convert each of the set of potentially visible geometry in a scene to create a rendered image. The computational cost of rasterization techniques depends primarily on the geometric complexity of the scene, such as the number of potentially visible geometric primitives, rather than the number of pixels covered by the scene geometry. For this reason, rasterization techniques are generally used for real-time rendering, as they can render a large number of pixels with minimal additional computational cost. By limiting the geometric complexity of scenes, rasterization can render high-resolution images at frame rates suitable for interactive applications.

Ray tracing typically follows the path of a ray of light through a three dimensional scene to calculate attributes such as the absorption, reflection, and/or refraction of the ray. Typically, ray tracing calculates the attributes of at least one ray for each pixel in the rendered image. However, the computation time for each ray is somewhat independent of the geometric complexity of the three dimensional scene. As a result, the computational cost of ray tracing depends primarily on the number of pixels to be rendered, rather than the complexity of the scene. At typical image resolutions, the computational cost of rendering images using ray tracing is typically much greater than that from rasterization, making real-time ray tracing difficult or impossible with currently available graphics hardware and software.

There is strong demand for improved visual quality and fidelity in real-time computer graphics. To meet this demand, application developers are creating content that includes a larger number of geometric primitives. The increased number of geometric primitives are typically used to represent objects with finer levels of detail. Thus, as geometric complexity of a scene increases, the average size of geometric primitives typically decreases. For example, a character model may have a large number of small (often sub-pixel size) triangles representing each strand of its hair. Unfortunately, rasterization is often inefficient for rendering a large number of geometric primitives, especially when the geometric primitives cover a relatively small number of pixels. In these cases, rendering techniques, such as ray tracing, are often more efficient.

It is therefore desirable for a system and method to efficiently render a large number of geometric primitives by selecting the most appropriate rendering techniques for different portions of the scene to be rendered. It is further desirable that the system and method be capable of dynamically selecting the most appropriate rendering technique for geometric primitives based upon the viewpoint used for rendering and other parameters. It is also desirable for the system and method to incur minimal processing overhead in determining the most appropriate rendering technique to apply to one or more primitives. Additionally, it is desirable to be able to implement all or portions of the system and method in software and/or in dedicated hardware.

BRIEF SUMMARY OF THE INVENTION

An embodiment of the invention selects different rendering techniques for portions of a scene based on a statistical estimate of the rendering cost for each portion. A scene is partitioned into a bounding volume hierarchy. For each bounding volume, a statistical model of the spatial distribution of geometric primitives within the bounding volume is created. An image to be rendered is partitioned into screen regions and each screen region is associated with one or more bounding volumes and their statistical models. The associated statistical models of a screen region are evaluated to estimate the rendering cost, such as the probable number of geometric primitives per pixel, for the screen region. Based on the rendering cost, the screen region is assigned to a dense geometry renderer, such as a ray tracing renderer, or a sparse geometry renderer, such as a rasterization renderer. Rendered screen regions are combined to form a rendered image.

In an embodiment, a method of rendering at least a portion of an image of a scene includes creating a bounding volume enclosing at least a portion of the geometric primitives of the scene and creating a statistical model for the bounding volume. The statistical model represents a spatial distribution of the geometric primitives within the bounding volume. The method defines a screen region of the image, estimates a rendering cost of the screen region from at least the statistical model of the associated bounding volume, and selects one of at least two different renderers to render the geometric primitives enclosed by the bounding volume based on the rendering cost.

In an embodiment, estimating a rendering cost of the screen region includes projecting the statistical model into a view space associated with the image, determining a probability value that represents the probability the pixel is covered by at least one geometric primitive enclosed by the bounding volume using the projected statistical model for each of at least a portion of the set of pixels of the screen region, and evaluating the probability values of the portion of the set of pixels to determine the rendering cost in terms of a probable number of geometric primitives per pixel for the screen region. The statistical model can be projected using an orthographic or perspective transformation. The statistical model can include a mean position and/or size of the geometric primitives enclosed by the bounding volume. The statistical model can also include at least one standard deviation in position of the geometric primitives enclosed by the bounding volume. To create the statistical model, geometric primitives can be represented by a set of rotational or non-rotational invariant representative objects. Statistical attributes can then be determined from the set of representative objects.

BRIEF DESCRIPTION OF THE DRAWINGS

The invention will be described with reference to the drawings, in which.

In the drawings, the use of identical reference numbers indicates similar elements.

DETAILED DESCRIPTION OF THE INVENTION

Figure 1:
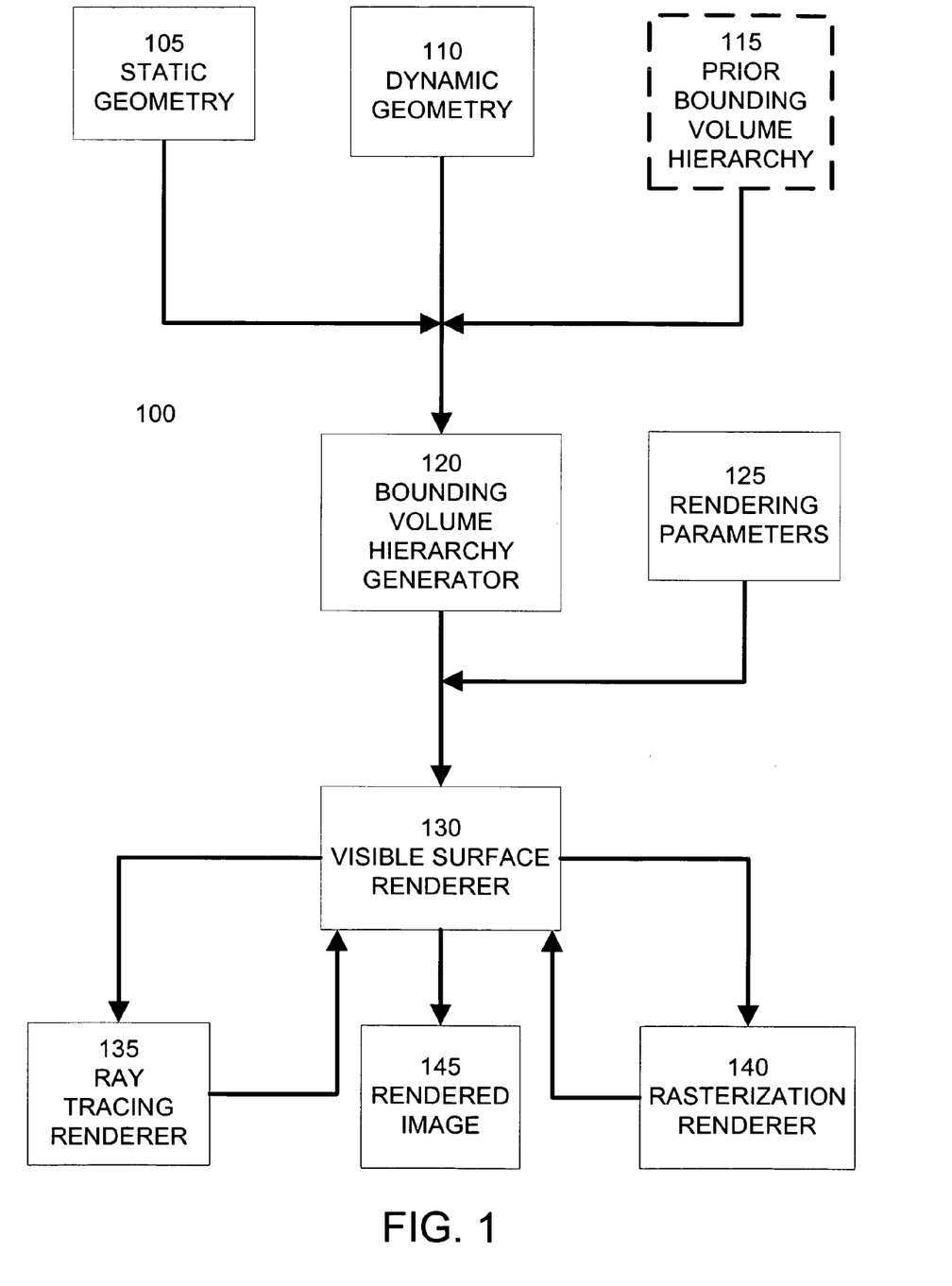
FIG. 1 illustrates a computer graphics rendering system according to an embodiment of the invention.

FIG. 1 illustrates a computer graphics rendering system 100 according to an embodiment of the invention. Geometry representing a scene, including static geometry 105 and dynamic geometry 110, is supplied to bounding volume hierarchy generator 120. In this embodiment, geometry is separated into static (e.g. non-moving and/or non-deforming) and dynamic (moving and/or deforming) portions to improve the performance of bounding volume hierarchy generator 120. In alternate embodiments, scene geometry is provided to bounding volume hierarchy 120 without any classification into static or dynamic categories. In a further embodiment, a previously-created bounding volume hierarchy 115, created for example during a pre-processing stage or alternatively during the rendering of a previous frame, is also provided to bounding volume hierarchy generator 120.

Bounding volume hierarchy generator 120 generates a bounding volume hierarchy representing the approximate spatial distribution of geometry in the scene. For animation, real-time rendering, and interactive applications, the bounding volume hierarchy generator 120 creates a bounding volume hierarchy for each frame of animation.

A bounding volume is a typically a relatively simple three-dimensional object, such as a sphere, cube, tetrahedron, or convex hull, that encloses one or more geometric primitives. Typically, bounding volumes are defined to be as small as possible while still enclosing related geometry. For example, if a scene includes a discrete object, such as a model of a chair defined by numerous geometric primitives, a bounding volume can be defined to enclose the entire chair model. A bounding volume hierarchy is an arrangement of one or more bounding volumes enclosing all of the geometry of the scene. Any type of bounding volume hierarchy known in the art can be used, including a voxel grid, a binary space partition tree, or octree.

Bounding volume hierarchy generator 120 can use the previously-created bounding volume hierarchy 115 to generate a new bounding volume hierarchy. For example, if previously-created bounding volume hierarchy 115 represents the approximate spatial distribution of geometry in the scene from a previous frame of animation, the bounding volume hierarchy generator 120 may generate a new bounding volume hierarchy by updating the previously-created bounding volume hierarchy 115 with any changes in scene geometry from the previous frame. In another example, previously-created bounding volume hierarchy 115 can represent the approximate spatial distribution of the static geometry 105. Bounding volume hierarchy generator 120 can then augment the previously-created bounding volume hierarchy 115 with additional bounding volumes representing the approximate spatial distribution of dynamic geometry 110.

In addition to the bounding volume hierarchy, an embodiment of the bounding volume hierarchy generator 120 creates statistical models for each one of at least a portion of the bounding volumes in bounding volume hierarchy. As discussed in detail below, a visible surface renderer module selects the most appropriate rendering technique to apply to the geometry within the bounding volume using the bounding volume's statistical model. In general, each bounding volume's statistical model includes information describing the relative size, density, and distribution of geometry within the bounding volume. An example statistical model is presented in detail below; however, embodiments of the invention can use statistical models incorporating any type of statistical representation of the size, density, and/or distribution of geometry within a bounding volume. In an embodiment, for static bounding volumes or bounding volumes with geometry that does not change shape, statistical models can be created once and cached for future uses. For bounding volumes with changing geometry, the bounding volume hierarchy generator 120 creates a statistical model for the bounding volume each time the geometry changes.

The output of bounding volume hierarchy generator 120, including a bounding volume hierarchy representing the approximate spatial distribution of geometry in the scene and statistical models associated with the bounding volumes, and rendering parameters 125 are provided to the visible surface renderer 130. Rendering parameters 125 can include a view transformation specifying the viewpoint from which the scene will be rendered.

The visible surface renderer 130 initializes a frame buffer to be used to store a rendered image of the scene as specified by the rendering parameters. Using the bounding volume hierarchy, the visible surface renderer divides the frame buffer into one or more screen regions, each of which may be associated with one or more bounding volumes from the bounding volume hierarchy. For each screen region, the visible surface renderer 130 evaluates the statistical models associated with the screen region's bounding volumes. From this evaluation, an embodiment of the visible surface renderer selects a rendering technique for rendering the screen region.

Based upon the rendering technique selected for a screen region, the visible surface renderer 130 dispatches rendering tasks to the appropriate renderer to render the geometry within the screen region. For each screen region assigned to a renderer, the renderer determines one or more attributes for each pixel in the assigned screen region based upon the geometry in the bounding volumes associated with the screen region. Pixel attributes can include color; transparency; depth information; vectors for lighting, shading, and other effects; and/or other attributes, such as an object identification information specifying one or more objects in the scene contributing the value of the pixel. In an embodiment, the renderers can apply a variety of lighting, shading, texturing, and other visual effects in rendering the geometry in bounding volumes. In another embodiment, some or all of these visual effects can be deferred to a later rendering stage.

In an embodiment, the visible surface renderer 130 selects either the ray tracing renderer 135 or the rasterization renderer 140 to render a screen region. Ray tracing renderer 135 specifies one or more rays for each pixel in a screen region. For each ray, the ray tracing renderer determines the location of one or more intersections of the ray with the geometry in the associated bounding volumes. From the location of the ray intersection, the ray tracing renderer 135 can determine all or part of the pixel attributes for the pixel associated with the ray. Rasterization renderer 140 applies scan conversion to the geometry in the bounding volumes associated with the screen region to determine the pixel attributes for all of the pixels in the screen region. In further embodiments, additional renderers employing any other rendering technique for converting three-dimensional geometry into pixel attributes can be employed.

The rendering results from the ray tracing renderer 135 and rasterization renderer 140, which includes the rendered pixels from the screen regions assigned to renderers 135 and 140, are returned to the visible surface renderer 130. The visible surface renderer 130 combines the rendered pixels from each screen region to form a rendered image 145. In a further embodiment, rendered image 145 can be further processed by subsequent rendering stages to add further lighting and shading effects.

Figure 2:
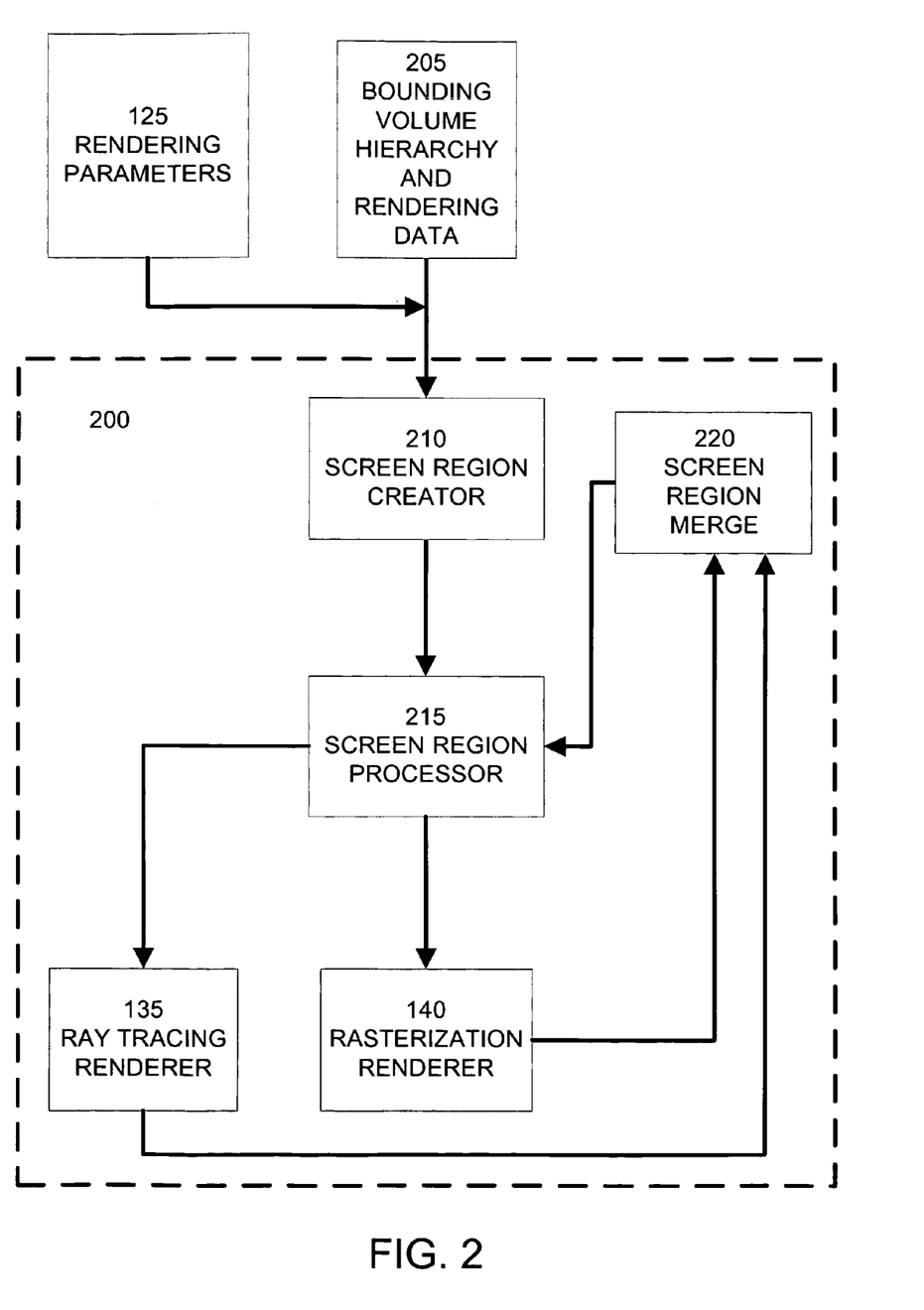
FIG. 2 illustrates a portion of a computer graphics rendering system according to an embodiment of the invention.

FIG. 2 illustrates a portion 200 of a computer graphics rendering system according to an embodiment of the invention. In an embodiment, portion 200 is included in the visible surface renderer 130 discussed above. In an embodiment, portion 200 receives the rendering parameters 135. Additionally, portion 200 receives the bounding volume hierarchy and rendering data 205 previously generated. The rendering data includes the statistical models 205 associated with the bounding volume hierarchy.

Screen region creator 210 divides the frame buffer into one or more screen regions based upon the bounding volume hierarchy 205. In an embodiment, the screen region creator 210 uses the rendering parameters 125, which include a view transformation, to transform the surfaces of each of the bounding volumes of the bounding volume hierarchy 205 into the screen space coordinate system and culls any bounding volumes residing outside the view frustum. In the screen space coordinate system, the surfaces of each bounding volume is projected as one or more polygons. In a further embodiment, the multiple polygons representing the surfaces of a bounding volume can be replaced by a single polygon, such as a bounding rectangle. The polygon or polygons representing each of the projected bounding volume is defined as a screen region and is associated with the bounding volume, its screen region, and the geometry enclosed by the bounding volume.

In a further embodiment, if polygons from two or more different bounding volumes overlap when projected into the screen space, the overlapping polygons or the overlapping portions of these polygons are merged into a new screen region. For example, this can occur if the projected polygons of a distant bounding volume, relative to the viewpoint, are partially or entirely covered by the projected polygons of a closer bounding volume. As this new screen region is derived from two or more bounding volumes, it will be associated with two or more bounding volumes as well as their respective statistical models and enclosed geometry. For scenes with relatively dense arrangements of geometry, a screen region will be associated with a number of different bounding volumes, enclosing the scene geometry at a variety of different depths relative to the viewpoint. In yet a further embodiment, the bounding volumes associated with a screen region are organized by their respective distances from the viewpoint.

In an embodiment the screen region creator 210 outputs a set of screen regions and their associated bounding volumes, statistical models, and geometry (or information identifying these associated elements) to the screen region processor 215. Screen region processor 215 examines each screen region and its associated statistical model or models to estimate the computation costs of rendering the geometry of the associated bounding volume or volumes using different rendering techniques.

In a further embodiment, screen region processor 215 selects the bounding volumes associated with a screen region and having surfaces visible from the viewpoint. Initially, this can be determined by selecting the closest bounding volume associated with the screen region, relative to the viewpoint. If the projected polygons of a more distant bounding volume are only partially covered by the projected polygons of a closer bounding volume, there can be multiple bounding volumes having visible surfaces.

The screen region processor 215 processes the screen region by evaluating the statistical models of the one or more selected bounding volumes. The screen region processor 215 then assigns the screen region and its selected bounding volumes to the renderer having the lowest estimated computational cost. In an embodiment, these renderers can include ray tracing renderer 135 and rasterization renderer 140.

The renderers determine pixel attributes for the pixels covered by each screen region. In an embodiment, each renderer processes all of the geometry enclosed by the selected bounding volumes associated with a screen region. As discussed above, pixel attributes for the pixels of the screen region are returned to portion 200, where screen region merge 220 combines the pixel attributes received from different screen regions into a rendered image.

In an embodiment, the screen region merge 220 tracks the results of the renderer and determines whether all of the pixels in each screen region have had pixel attribute values determined. For pixels that have not had pixel attribute values determined, the screen region merge 220 regroups these pixels into smaller screen regions. The newly formed screen regions inherit the bounding volume associations from the larger source screen region. Newly formed screen regions are forwarded to screen region processor 215 for further evaluation and additional rendering. In an embodiment, the bounding volumes already rendered are disassociated from the newly formed screen region or regions, so that more distant bounding volumes will be uncovered, evaluated, and rendered. Additional rendering passes for more distant bounding volumes can be repeated until the screen region merge 220 determines that there are no more pixels in any screen regions to be rendered or until there are no more unrendered bounding volumes associated with any screen region.

Figure 3:
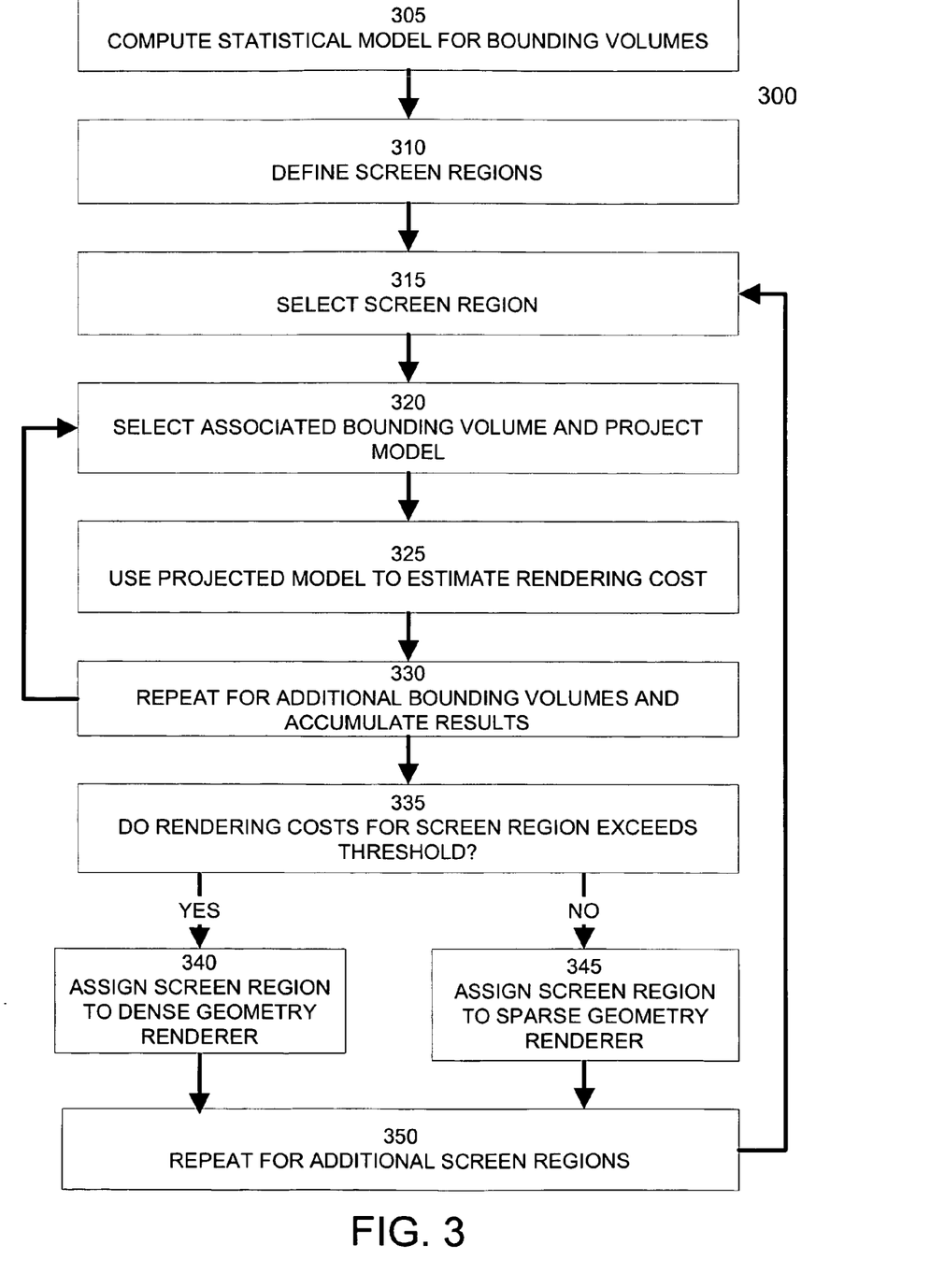
FIG. 3 illustrates a method of selecting a rendering technique to apply to rendering data according to an embodiment of the invention.

FIG. 3 illustrates a method 300 of selecting a rendering technique to apply to rendering data according to an embodiment of the invention. Step 305 computes a statistical model for each bounding volume in the bounding volume hierarchy. As discussed above, this computation can be performed when the bounding volume hierarchy is generated, for example in a preprocessing phase or during run-time if all or portions of the bounding volume hierarchy are generated dynamically.

Figure 4A:
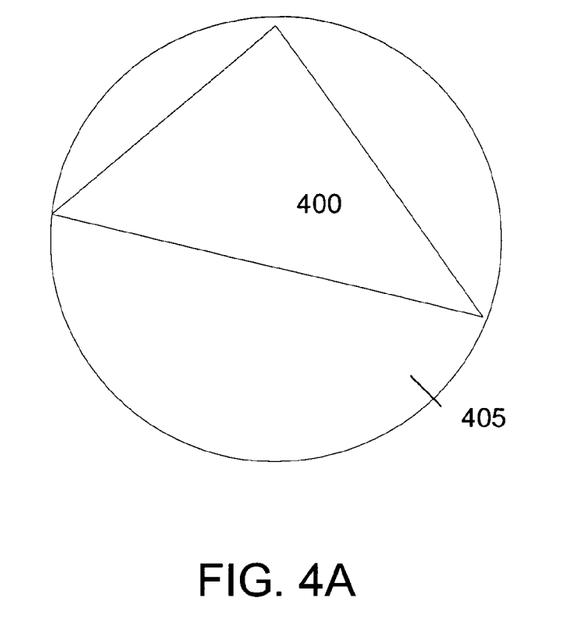
FIGS. 4A-4C illustrate an example statistical model suitable for use by a method of selecting a rendering technique to apply to rendering data according to an embodiment of the invention.
Figure 4B:
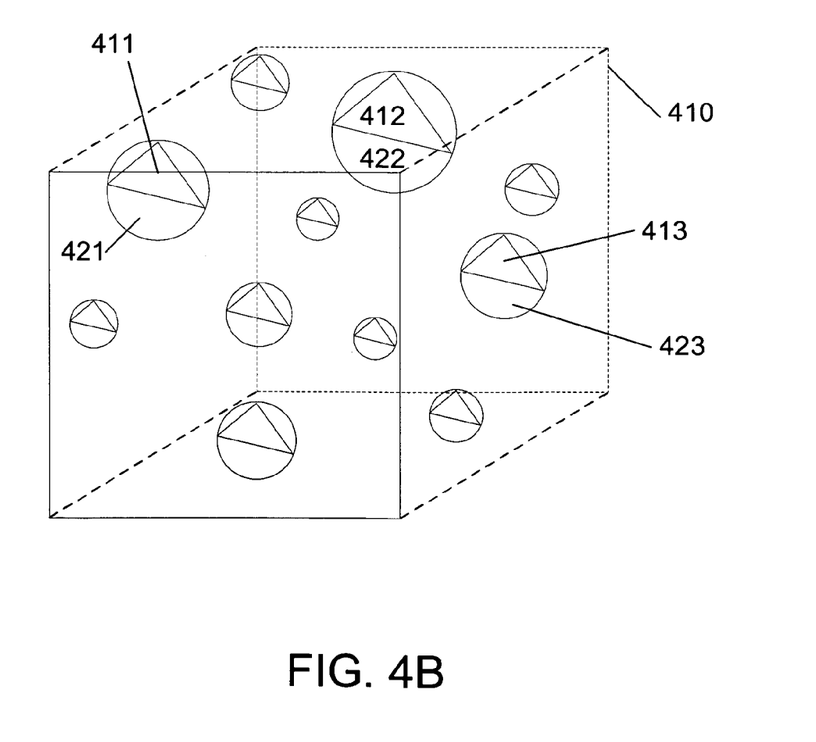
Figure 4C:
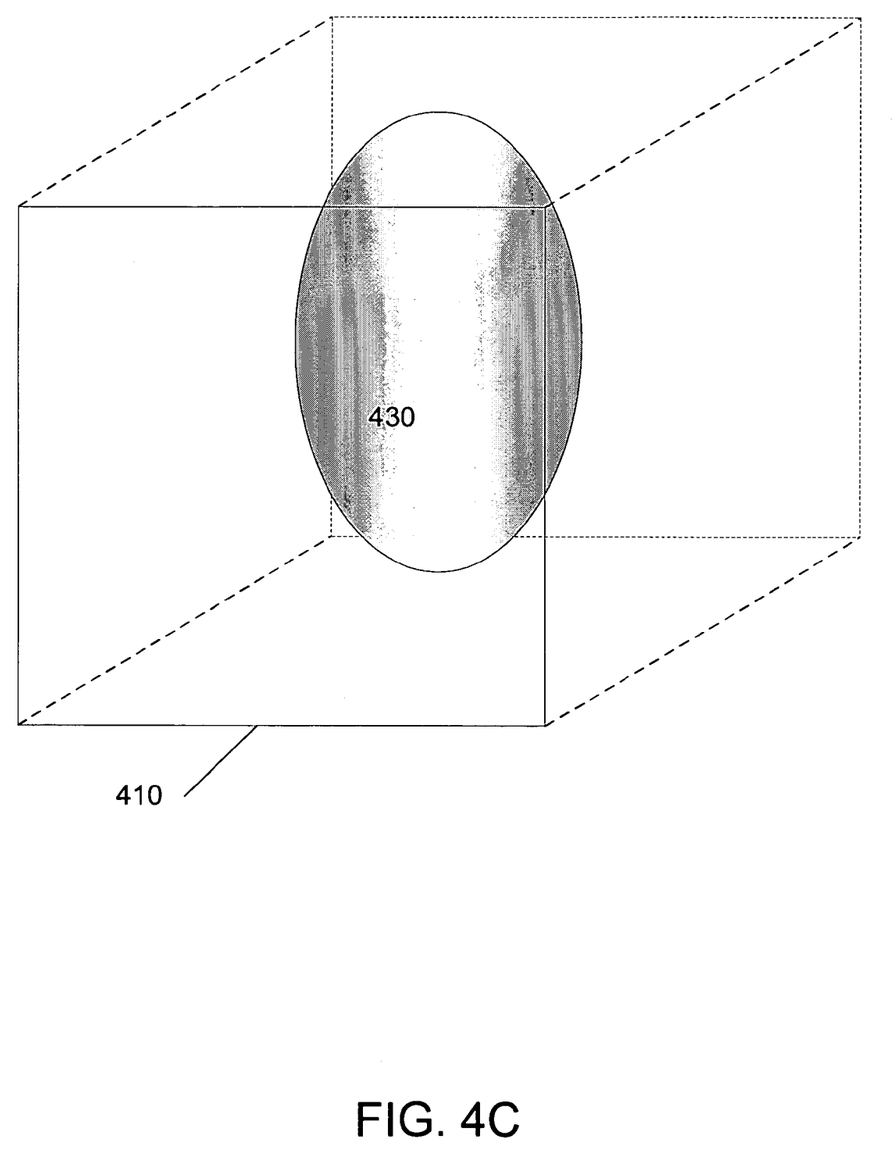

FIGS. 4A-4C illustrate an example statistical model suitable for use by a method of selecting a rendering technique to apply to rendering data according to an embodiment of the invention. In this example, a statistical model of the geometry of a bounding volume is created by first representing each geometric primitive in the bounding volume by a sphere. The sphere should be sized so as to enclose the geometric primitive as closely as possible. Spheres have the advantage of being rotationally invariant, or appearing the same from any orientation, which can simplify the creation of the statistical. FIG. 4A illustrates a geometric primitive 400, which is a triangle in this example, bounded by a sphere 405.

In another embodiment, other volumes can be used to represent each geometric primitive. Rotationally variant volumes, such as Zernicke polynomials, can be used to represent geometric primitives in the statistical model. Zernicke polynomials are a rotationally variant manner of encoding a three-dimensional shape. As discussed in detail below, this approach has the advantage of providing a more accurate projection from any orientation, resulting in a smaller overestimation error in the probable number of primitives per pixel. In additional embodiments, several related or connected geometric primitives are represented by a single sphere or other type of volume. In this embodiment, the statistical model, discussed below, should include the average number of geometric primitives per sphere or other representative volume.

FIG. 4B illustrates an example bounding volume 410 in which all of the geometric primitives have been represented by rotationally invariant volumes, such as spheres for the purposes of constructing a statistical model of the geometry in bounding volume 410. Example bounding volume 410 is a cube that includes a numerous geometric primitives, including primitives 411, 412, and 413. The primitives 411, 412, and 413 are represented by spheres 421, 422, and 423. As the geometric primitives in bounding volume 410 can have any arbitrary location, orientation, and size, the spheres representing these geometric primitives can also have any arbitrary location and size. As spheres appear the same from any orientation, in this embodiment the orientation of the spheres can be disregarded for the purposes of constructing a statistical model.

Using the size and distribution of the spheres representing geometric primitives in the bounding volume, step 305 can calculate one or more statistical attributes reflecting the approximate size and distribution of geometric primitives in bounding volume. Example statistical attributes include the mean position of the spheres in the bounding volume, the standard deviation of the position of the spheres in one or more directions (for example, along the x, y, and z axes), and the mean radius of the spheres in the bounding volume. One or more of statistical attributes form a statistical model of the size and distribution of geometric primitives within a bounding volume.

FIG. 4C illustrates a graphical representation of an example statistical model 430. In this graphical representation, the example statistical model 430 is represented as an ellipsoid. The center of this ellipsoid corresponds to the mean position of the spheres representing geometric primitives in the bounding volume. The major and minor axes of the ellipsoid can be viewed as the standard deviations of the positions of these spheres along the x, y, and z axes. The mean sphere radius is omitted for clarity from this graphical representation, but can be included in the statistical model. It should be noted that this graphical representation of the statistical model is intended for the purposes of illustration only and does not limit the number or type of statistical attributes that can be included in a statistical model of the size, position, and distribution of geometric primitives within the bounding volume.

Step 310 defines screen regions. As discussed above, an embodiment of the invention defines screen regions by projecting the surfaces of each bounding volume in the bounding volume hierarchy into the view space coordinate system.

Step 315 selects a screen region to be rendered. Step 320 selects a bounding volume associated with the selected screen region. In an embodiment, step 320 selects one of the currently visible bounding volumes closest to the viewpoint. A bounding volume is considered visible if, for any pixel in the bounding volume's associated screen region, a projected polygon of the bounding volume is the closest to viewpoint. As discussed above, bounding volumes already rendered can be disassociated with a screen region, thereby making visible the distant bounding volumes that were previously covered by closer bounding volumes. Step 320 then projects the statistical model associated with the selected bounding model into view space. By projecting the statistical model into view space, method 300 accounts for the changing spatial distribution of geometric primitives relative to the viewpoint. This projection can be accomplished using coordinate space transformation techniques known in the art.

Referring to the above-described example statistical model, which includes the mean position of the spheres in the bounding volume ($\mu'$), the standard deviation of the position of the spheres along the x, y, and z axes ($\sigma = \lfloor \sigma_x, \sigma_y, \sigma_z \rfloor$), and the mean radius of the spheres in the bounding volume ($\mu_r'$), the projection of the statistical model into the view space coordinate system can be determined by an embodiment of the invention using the following values: A view space coordinate system transformation matrix (V) defining the transformation of points from a coordinate system associated with a bounding volume or the entire scene to the view space coordinate system; the transpose of this matrix ($V^T$); the world coordinates matrix (X), and a covariance matrix of X, (C). The matrix X refers to the set of points, such as the vertices of geometric primitives or to the mean values of the vertices of geometric primitives, used to create the statistical model. The variable n, discussed below, is the number of points in the matrix X.

Using the values, an orthographic projection ($\mu$, C, $\sigma$, $\mu_r$) of the statistical model is as follows:

$$\mu = V\mu'$$
$$C = \frac{1}{n}(X - \mu')(X - \mu')^T$$
$$\sigma = \mathrm{diag}(VCV^T)$$
$$\mu_r = \sqrt[3]{\det(\mu_r')}$$

The above equations define an orthographic projection of the statistical model of a bounding volume into view space. To perform a perspective projection of the statistical model, an additional perspective transformation should be applied to the orthographic projection of the statistical model. In an embodiment, a perspective transformation is defined by the coordinates of the bounding planes of the view frustum: left, right, bottom, top, near, and far. This definition is commonly used in graphics APIs, such as the glFrustum call of the OpenGL API. Using these parameters, the orthographic projection of the mean position of the statistical model, $\mu$, can be transformed to a perspective projected version $\mu''$ as follows:

$$\mu_x'' = 2\mu_x\left(\frac{\mathrm{near}}{\mathrm{right} - \mathrm{left}}\right) + \mu_x\left(\frac{\mathrm{right} + \mathrm{left}}{\mathrm{right} - \mathrm{left}}\right)$$

-continued $$\mu''_y = 2\mu_y\left(\frac{near}{top-bottom}\right) + \mu_y\left(\frac{top+bottom}{top-bottom}\right)$$

The effect of this perspective transformation is to shift the center of the statistical model in the direction of the perspective vanishing point by an amount related to the mean depth. Perspective correction can also be applied to the standard deviation and mean radius portions of the example statistical model.

Once step 320 projects the statistical model associated with the selected bounding volume into view space, step 325 evaluates the projected statistical model to estimate the rendering cost of the geometry enclosed by the selected bounding volume. In an embodiment, the rendering cost is estimated by determining the probable number of primitives covering each pixel in the screen region associated with the bounding volume.

An embodiment of step 325 uses a probability density function determined from the projected statistical model to estimate the number of geometric primitives covering at least a portion of the pixels in the screen region. Step 325 can estimate the probable number of covering geometric primitives for each pixel in the selected screen region or in another embodiment, only a portion of the pixels in the screen region. A probability density function, $\phi(Z)$, is determined from the values of the projected statistical model, for example $(\mu'',C,\sigma'',\mu_r'')$. In an embodiment, the probability density function can be determined separately for the horizontal and vertical directions in the view space coordinate system and then combined at any point to determine the joint probability density function. The probability density function $\phi(Z)$ can be determined or approximated from the statistical model using any standard algorithm known in the art provided it is defined for the Standard Normal Distribution.

For each pixel (K) in the selected screen region centered at $(x_K, y_K)$, an embodiment of step 325 determines the location of the center of the pixel on the standard normal distribution of the unit interval as follows:

$x_S=(x_K-\mu_x'')/\sigma_x$ $y_S=(y_K-\mu_y'')/\sigma_y$

Using the location of the pixel center on the standard normal distribution of the unit interval, step 325 can determine the probability ($Pr_K$) that the pixel is covered by at least one geometric primitive as follows:

$Pr_K=\phi(x_S)\phi(y_S)$

An embodiment of step 325 repeats this computation of $Pr_K$ for some or all of the pixels covered by the screen region. Step 330 determines if there are any other visible bounding volumes associated with the selected screen region. Multiple bounding volumes associated with a screen region can be visible if the projected polygons of two or more bounding volumes do not overlap or partially overlap. If there are visible bounding volumes associated with the selected screen region have not been processed by steps 320 and 325, step 330 directs method 300 to repeats steps 320, 325, and 330 for the other bounding volumes. In an embodiment, step 330 accumulates the values of $Pr_K$ determined for each pixel from each of the visible bounding volumes associated with the screen region.

Once all of the visible bounding volumes associated with a screen region have been selected and processed to determine an aggregate value of $Pr_K$ for each of at least a portion of the pixels covered by the selected screen region, step 335 evaluates the estimated rendering cost of the screen region.

In an embodiment, step 335 determines an estimated rendering cost for the screen regions from the values of $Pr_K$ for the pixels covered by the screen region. In one implementation, the number of pixels having a value of $Pr_K$ greater than a threshold probability value, for example ½ p, where p is the number of pixels evaluated in the screen region, is counted. The total number of geometric primitives is then divided by the number of pixels over the threshold probability value to determine a probable number of primitives per pixel for the selected screen region. In a further embodiment, the probable number of primitives per pixels is scaled down by a constant to reflect the fact that bounding spheres or other representative objects used to create the statistical model overestimate the pixel coverage of an enclosed primitive. This constant can be determined empirically or by assuming a uniform distribution of geometric primitive orientations with respect to the screen, which results in the constant being the average amount of overestimated pixel coverage.

If the probable number of primitives per pixel exceeds a threshold value, method 300 proceeds to step 340, where the selected screen region is assigned to a renderer suitable for handling dense amounts of geometry in a screen region, such as a ray tracing renderer. Alternatively, if the probable number of primitives per pixel does not exceed a threshold value, method 300 proceeds to step 345, where the selected screen region is assigned to a renderer suitable for handling large screen regions with relatively sparse geometry, such as a rasterizing renderer.

Step 350 determines if there are additional screen regions to be processed. In an embodiment, these additional screen regions include the set of screen regions defined in step 310. In an additional embodiment, step 350 can create one or more additional screen regions from the unrendered pixels of a previously processed screen region.

Figure 5:
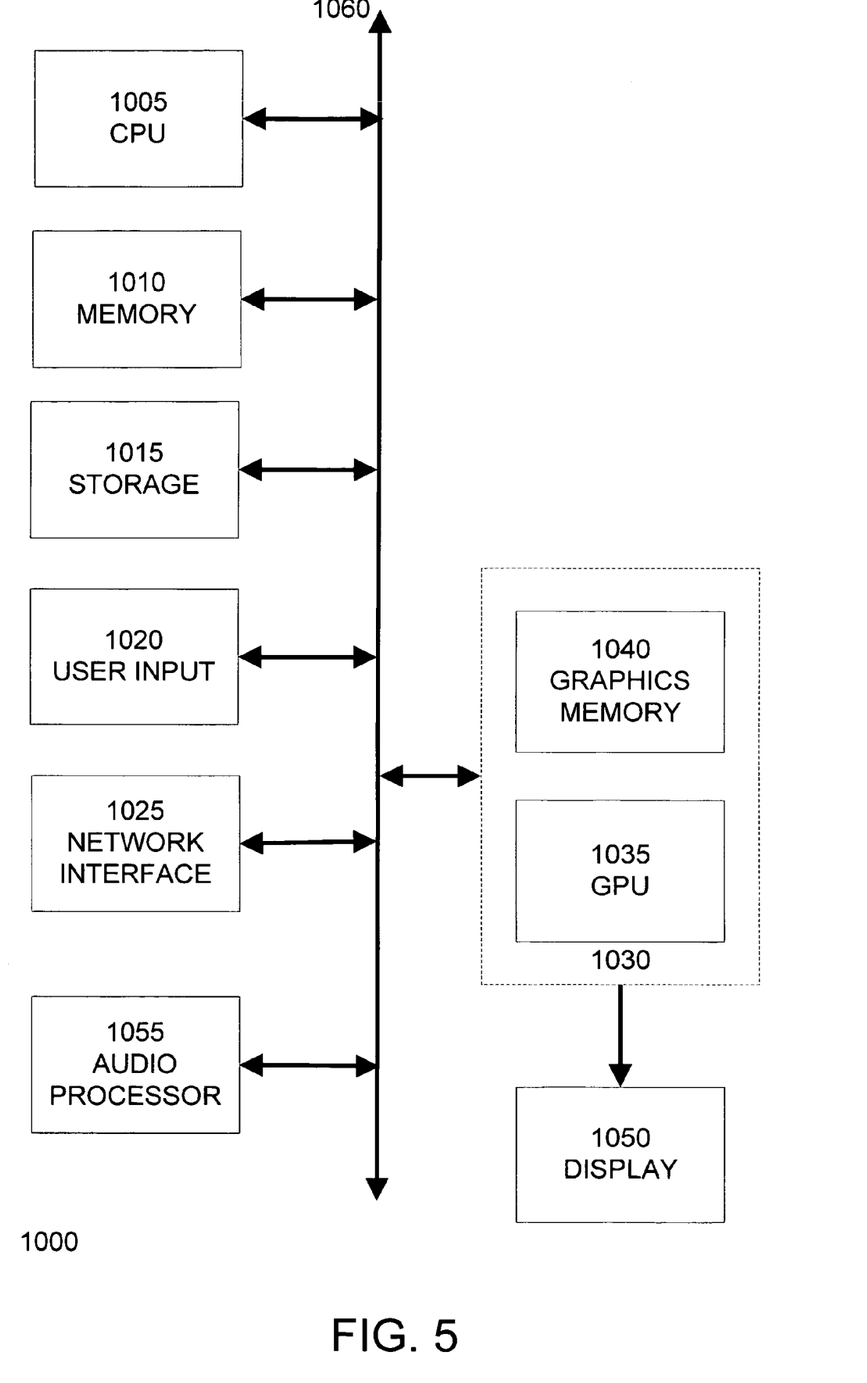
FIG. 5 illustrates an example computer system suitable for implementing an embodiment of the invention.

FIG. 5 illustrates an example computer system suitable for implementing an embodiment of the invention. FIG. 5 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Embodiments of the invention can be implemented with the above described example computer system in a variety of ways. In one implementation, the graphics subsystem 1030 executes a rasterization renderer and the CPU 1005 constructs the bounding volume hierarchy and associated statistical models, evaluates the statistical models for each screen region, and executes a ray tracing renderer. In an alternative embodiment, the graphics processing subsystem 1030 includes the visible surface renderer 130, the ray tracing renderer 135, and/or the rasterization renderer 140. As a result, all or a portion of the steps of method 300, including steps 315 through 350 can be performed by the graphics subsystem 1030.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of rendering at least a portion of an image of a scene, the scene including geometric primitives, the method comprising:

creating a bounding volume enclosing at least a portion of the geometric primitives of the scene;

creating a statistical model for the bounding volume, wherein the statistical model represents a spatial distribution of the geometric primitives within the bounding volume;

defining a screen region of the image, wherein the screen region is associated with the bounding volume and includes a set of pixels;

estimating a rendering cost of the screen region from at least the statistical model of the associated bounding volume;

selecting one of at least two different renderers to render the geometric primitives enclosed by the bounding volume based on the rendering cost; and rendering the geometric primitives enclosed by the bounding volume using the selected renderer to produce an image for display on a display device, wherein estimating a rendering cost of the screen region includes:

projecting the statistical model into a view space associated with the image;

for each of at least a portion of the set of pixels of the screen region, determining a probability value that represents the probability the pixel is covered by at least one geometric primitive enclosed by the bounding volume using the projected statistical model; and evaluating the probability values of the portion of the set of pixels to determine the rendering cost in terms of a probable number of geometric primitives per pixel for the screen region.

2. The method of claim 1, wherein selecting includes:

instructing a first renderer to render the geometric primitives enclosed by the bounding volume if the rendering cost of the screen region exceeds a threshold; and instructing a second renderer to render the geometric primitives enclosed by the bounding volume if the rendering cost of the screen region does not exceed a threshold.

3. The method of claim 2, wherein the first renderer is a ray tracing renderer.

4. The method of claim 2, wherein the second renderer is a rasterization renderer.

5. The method of claim 1, wherein the bounding volume is part of a bounding volume hierarchy partitioning the geometric primitives of the scene.

6. The method of claim 5, wherein the bounding volume hierarchy is a voxel grid.

7. The method of claim 5, wherein the bounding volume hierarchy is a binary space partition tree.

8. The method of claim 1, wherein defining a screen region includes:

projecting the bounding volume into a view space associated with the image to form a set of at least one polygon covering at least a first portion of the image; and defining the screen region as at least the first portion of the image covered by the set of at least one polygon.

9. The method of claim 8, wherein defining the screen region further includes defining a new polygon enclosing the set of at least one polygon and defining the screen region as a second portion of the image covered by the new polygon and including the first portion of the image.

10. The method of claim 1, wherein evaluating the probability values of the portion of the set of pixels further includes:

for each pixel of at least the portion of the set of pixels of the screen region, combining the probability value with a second probability value, wherein the second probability value represents the probability that the pixel is covered by at least one geometric primitive enclosed by a second bounding volume associated with the screen region.

11. The method of claim 1, wherein projecting the statistical model includes a perspective projection transformation.

12. The method of claim 1, wherein projecting the statistical model includes an orthographic projection transformation.

13. The method of claim 1, wherein at least a portion of the set of pixels potentially covers at least a portion of a projection of the bounding volume.

14. The method of claim 1, further comprising:
receiving from the selected renderer a first set of rendered pixels corresponding to at least a portion of the set of pixels of the screen region;
receiving from one of at least two different renderers an additional set of pixels corresponding to at least a portion of a set of pixels of a second screen region associated with a second bounding volume that encloses a second portion of the set of geometric primitives of the scene; and
combining the first set of rendered pixels and the additional set of pixels to form at least a portion of the image.

15. The method of claim 14, further comprising:
defining an additional screen region including a portion of the set of pixels of the screen region, wherein the portion of the set of pixels is not rendered to by the selected renderer.

16. The method of claim 1, wherein creating a statistical model for the bounding volume includes determining a mean position of the portion of the geometric primitives of the scene enclosed by the bounding volume.

17. The method of claim 1, wherein creating a statistical model for the bounding volume includes determining a mean size of the portion of the geometric primitives of the scene enclosed by the bounding volume.

18. The method of claim 1, wherein creating a statistical model for the bounding volume includes determining at least one standard deviation in position of the portion of the geometric primitives of the scene enclosed by the bounding volume.

19. The method of claim 1, wherein creating a statistical model for the bounding volume includes:
representing the portion of the geometric primitives of the scene enclosed by the bounding volume with a set of rotationally invariant objects; and
determining a set of statistical attributes of the set of rotationally invariant objects.

20. An information storage medium including instructions adapted to direct an information processing device to perform an operation to render at least a portion of an image of a scene, the scene including geometric primitives, the operation comprising:
creating a bounding volume enclosing at least a portion of the geometric primitives of the scene;
creating a statistical model for the bounding volume, wherein the statistical model represents a spatial distribution of the geometric primitives within the bounding volume;
defining a screen region of the image, wherein the screen region is associated with the bounding volume and includes a set of pixels;
estimating a rendering cost of the screen region from at least the statistical model of the associated bounding volume; and
selecting one of at least two different renderers to render the geometric primitives enclosed by the bounding volume based on the rendering cost; and
rendering the geometric primitives enclosed by the bounding volume using the selected renderer to produce an image for display on a display device,
wherein estimating a rendering cost of the screen region includes:
projecting the statistical model into a view space associated with the image;
for each of at least a portion of the set of pixels of the screen region, determining a probability value that represents the probability the pixel is covered by at least one geometric primitive enclosed by the bounding volume using the projected statistical model; and
evaluating the probability values of the portion of the set of pixels to determine the rendering cost in terms of a probable number of geometric primitives per pixel for the screen region.

21. The information storage medium of claim 20, wherein selecting includes:
instructing a first renderer to render the geometric primitives enclosed by the bounding volume if the rendering cost of the screen region exceeds a threshold; and
instructing a second renderer to render the geometric primitives enclosed by the bounding volume if the rendering cost of the screen region does not exceed a threshold.

22. The information storage medium of claim 21, wherein the first renderer is a ray tracing renderer.

23. The information storage medium of claim 21, wherein the second renderer is a rasterization renderer.

24. The information storage medium of claim 20, wherein the bounding volume is part of a bounding volume hierarchy partitioning the geometric primitives of the scene.

25. The information storage medium of claim 24, wherein the bounding volume hierarchy is a voxel grid.

26. The information storage medium of claim 24, wherein the bounding volume hierarchy is a binary space partition tree.

27. The information storage medium of claim 20, wherein defining a screen region includes:
projecting the bounding volume into a view space associated with the image to form a set of at least one polygon covering at least a first portion of the image; and
defining the screen region as at least the first portion of the image covered by the set of at least one polygon.

28. The information storage medium of claim 27, wherein defining the screen region further includes defining a new polygon enclosing the set of at least one polygon and defining the screen region as a second portion of the image covered by the new polygon and including the first portion of the image.

29. The information storage medium of claim 20, wherein evaluating the probability values of the portion of the set of pixels further includes:
for each pixel of at least the portion of the set of pixels of the screen region, combining the probability value with a second probability value, wherein the second probability value represents the probability that the pixel is covered by at least one geometric primitive enclosed by a second bounding volume associated with the screen region.

30. The information storage medium of claim 20, wherein projecting the statistical model includes a perspective projection transformation.

31. The information storage medium of claim 20, wherein projecting the statistical model includes an orthographic projection transformation.

32. The information storage medium of claim 20, wherein at least a portion of the set of pixels potentially covers at least a portion of a projection of the bounding volume.

33. The information storage medium of claim 20, further comprising:
- receiving from the selected renderer a first set of rendered pixels corresponding to at least a portion of the set of pixels of the screen region;
- receiving from one of at least two different renderers an additional set of pixels corresponding to at least a portion of a set of pixels of a second screen region associated with a second bounding volume that encloses a second portion of the set of geometric primitives of the scene; and
- combining the first set of rendered pixels and the additional set of pixels to form at least a portion of the image.

34. The information storage medium of claim 33, further comprising:
- defining an additional screen region including a portion of the set of pixels of the screen region, wherein the portion of the set of pixels is not rendered to by the selected renderer.

35. The information storage medium of claim 20, wherein creating a statistical model for the bounding volume includes determining a mean position of the portion of the geometric primitives of the scene enclosed by the bounding volume.

36. The information storage medium of claim 20, wherein creating a statistical model for the bounding volume includes determining a mean size of the portion of the geometric primitives of the scene enclosed by the bounding volume.

37. The information storage medium of claim 20, wherein creating a statistical model for the bounding volume includes determining at least one standard deviation in position of the portion of the geometric primitives of the scene enclosed by the bounding volume.

38. The information storage medium of claim 20, wherein creating a statistical model for the bounding volume includes:
- representing the portion of the geometric primitives of the scene enclosed by the bounding volume with a set of rotationally invariant objects; and
- determining a set of statistical attributes of the set of rotationally invariant objects.

* * * * *